(12) United States Patent
Satarasinghe

(10) Patent No.: US 6,192,246 B1
(45) Date of Patent: Feb. 20, 2001

(54) METHOD AND SYSTEM FOR INCREASING CAPACITY AND IMPROVING PERFORMANCE OF A CELLULAR NETWORK

(75) Inventor: Prasanna Jayaraj Satarasinghe, Plano, TX (US)

(73) Assignee: Nortel Networks Limited, Montreal (CA)

( * ) Notice: Under 35 U.S.C. 154(b), the term of this patent shall be extended for 0 days.

(21) Appl. No.: 09/288,885

(22) Filed: Apr. 9, 1999

Related U.S. Application Data

(62) Division of application No. 08/890,227, filed on Jul. 9, 1997.

(51) Int. Cl.$^7$ .................................................. H04B 1/00
(52) U.S. Cl. ............................................. 455/442; 455/436
(58) Field of Search .................................. 455/436, 437, 455/438, 439, 440, 441, 442, 443, 444; 370/331, 332, 333, 334

(56) References Cited

U.S. PATENT DOCUMENTS

| | | |
|---|---|---|
| 5,267,261 | 11/1993 | Blakeney, II et al. . |
| 5,327,575 | 7/1994 | Menich et al. . |
| 5,428,816 | 6/1995 | Barnett et al. . |
| 5,442,634 | 8/1995 | Cizek . |
| 5,613,205 * | 3/1997 | Dufour ................................. 455/440 |
| 5,623,535 | 4/1997 | Leung . |
| 5,640,414 | 6/1997 | Blakeney, II et al. . |
| 5,737,705 | 4/1998 | Ruppell et al. . |
| 5,740,535 | 4/1998 | Rune . |
| 5,828,661 | 10/1998 | Weaver, Jr. et al. . |
| 5,848,063 | 12/1998 | Weaver, Jr. et al. . |
| 5,854,981 | 12/1998 | Wallstedt et al. . |
| 5,905,960 * | 5/1999 | Nicholl et al. ........................ 455/450 |
| 5,917,811 * | 6/1999 | Weaver, Jr. et al. ................. 370/332 |
| 5,995,834 * | 11/1999 | Moore ................................... 455/434 |

FOREIGN PATENT DOCUMENTS

0701382A1  8/1995  (EP) .

OTHER PUBLICATIONS

Kang, Chang Soon et al, "CDMA Mobile Communication System Performance Analysis Tools for Network Parameter Planning," IEEE, Apr. 28, 1996.

* cited by examiner

Primary Examiner—Reinhard Eisenzopf
Assistant Examiner—Makoto Aoki
(74) Attorney, Agent, or Firm—Haynes and Boone, LLP

(57) ABSTRACT

Provided is a system and method for optimizing the performance of the cellular network by maintaining status values concerning the cell and adjusting the conditions for handoff in response to the status values. The status values may include a pilot signal strength measurement for the second cell, a round trip delay measurement from the second cell to the mobile unit, an a designation of whether the second cell is current, removed, or most recently removed. With the status values, a determination can be made to remove the second cell from the mobile unit's Active Set if either the pilot signal strength for the second cell falls below a predetermined threshold or the round trip delay value exceeds a predetermined maximum.

9 Claims, 1 Drawing Sheet

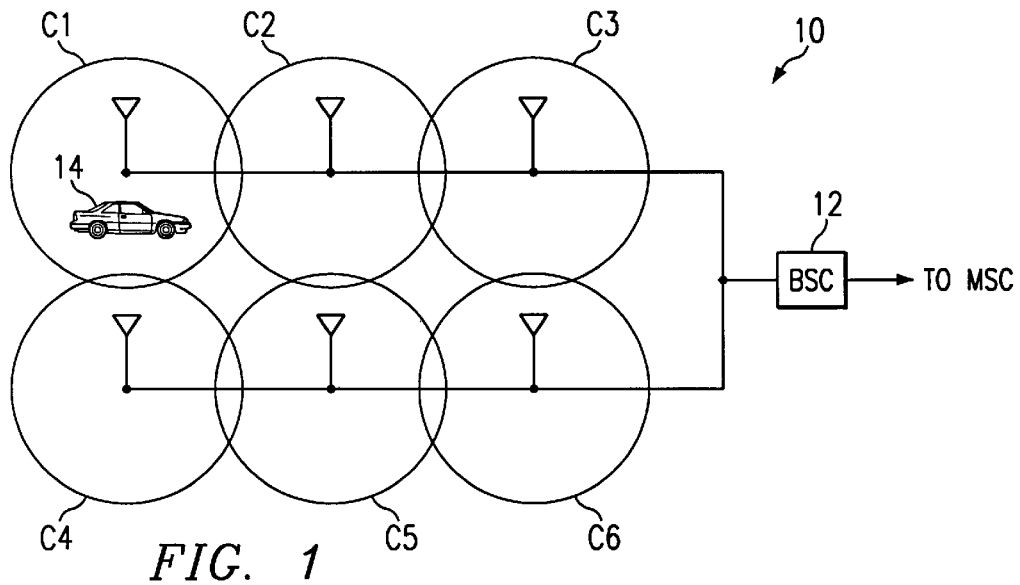
FIG. 1
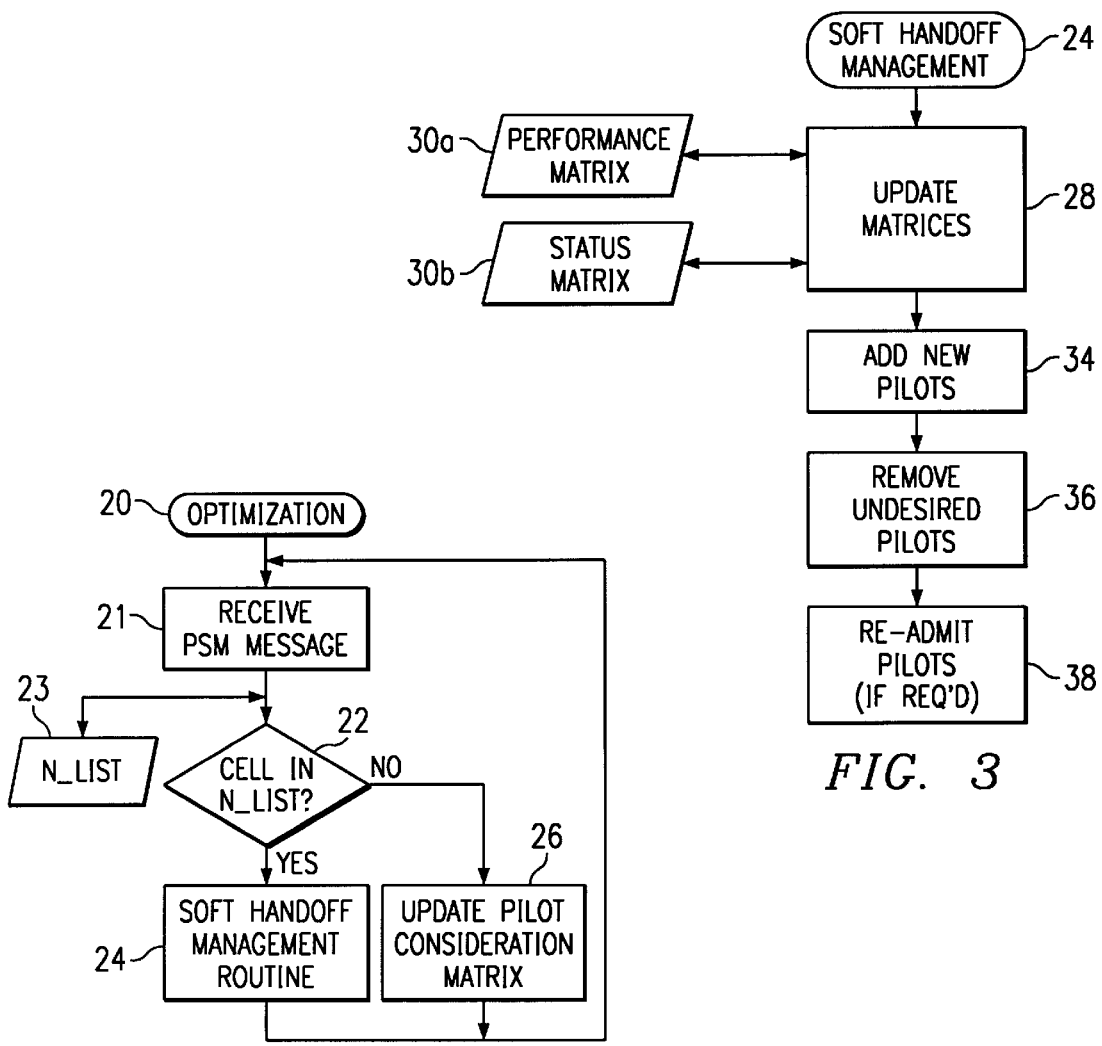
FIG. 2
FIG. 3

METHOD AND SYSTEM FOR INCREASING CAPACITY AND IMPROVING PERFORMANCE OF A CELLULAR NETWORK

This is a divisional of Ser. No. 08/890,227, filed Jul. 9, 1997 U.S. Pat. No. 5,974,318.

TECHNICAL FIELD

The invention relates generally to cellular telephone systems and, more particularly, to a method and system for increasing capacity for calls and reducing failures during call handoff and call setup in a cellular telephone network.

BACKGROUND OF THE INVENTION

A cellular telephone system serves a defined area by dividing the area into cells. Each cell is served by a single base station, or cell site, and each cell site is connected to a base station controller ("BSC"), which is connected to a message switching center ("MSC"), which is connected to the public switched telephone network ("PSTN"). A mobile unit is connected, or a call is completed, to the PSTN by establishing a radio frequency ("RF") link with a nearby cell site.

The situation in which a mobile unit ends communication with a first cell site and begins communication with a second cell site is referred to as a handoff. A hard handoff occurs when a first RF link between the mobile unit and the first cell site is ended, or dropped, before a second RF link between the mobile unit and the second cell site is established. Alternatively, a soft handoff occurs when the second RF link to the mobile unit is established before the first RF link is dropped. In soft handoff the first cell site is considered the dominant cell while the second cell site is considered a secondary cell. A mobile unit may concurrently enter soft handoff with several different secondary cells.

Soft handoffs typically occur when both cell sites operate on a common radio frequency, such as in a code division multiple access ("CDMA") cellular network. Typically, each cell site operating on the common radio frequency emits a pilot signal. When a mobile unit detects that the strength of a cell site's pilot signal exceeds a certain minimum threshold, it reports a pilot strength measurement ("PSM") message to the BSC via the dominant cell site. Each cell has its own list of potential handoff candidates, or neighbor list, and if the cell site, or pilot, associated with the pilot signal is in the neighbor list for the dominant cell, then the BSC informs the mobile unit to add the pilot to the mobile unit's Active Set. An Active Set is a list of secondary cells currently in soft handoff, or Active Set Pilots, maintained by the mobile unit. As a result, the BSC can thereby select the appropriate secondary cells for the mobile unit to enter soft handoff.

A detailed description of soft handoff parameters, terms, and procedures is disclosed in "*Mobile Station-Base Compatibility Standard for Dual-Mode Wide Band Spread Spectrum Cellular System*" TIA/EIA/IS-95-A Standard, Mar. 15, 1995, which is hereby incorporated by reference.

Under this procedure, however, the mobile unit may enter into soft handoff with undesired secondary cells. For example, although the pilot signal from the secondary cell exceeds the minimum threshold, the secondary cell site may be in a location that will improperly service the mobile unit due to other factors or obstructions not yet detected by the mobile unit, which could result in a dropped call. In addition, many pilot signals may exceed the minimum threshold such that soft handoff occurs with each associated secondary cell, requiring an extensive load on the BSC which could result in lost call capacity. Also, since each cell site has a finite number of channel elements with which to link to a mobile unit, each channel element unnecessarily used for soft handoff is thereby unavailable for other calls.

SUMMARY OF THE INVENTION

The present invention, accordingly, provides a method and system for increasing capacity and improving performance of a cellular network by improving the conditions for handoff. In one embodiment the method optimizes the performance of the cellular telephone network by maintaining a matrix of performance values concerning a cell in the network and adjusting certain conditions for handoff in response to the performance values. Examples of performance values include frequency statistics of successful handoffs to a second cell of the cellular telephone network, frequency statistics of failed handoffs to the second cell because the second cell was removed from the first cell's neighbor list, and frequency statistics of failed handoffs to the second cell because the second cell had insufficient resources.

In another embodiment, the method optimizes the performance of the cellular network by maintaining a matrix of status values concerning the cell and adjusting the conditions for handoff in response to the status values. Examples of the status values include a pilot signal strength measurement for the second cell, a designation of whether the second cell is current, removed, or most recently removed, and/or round trip delay measurement from the second cell to the mobile unit. With the status values, a determination can be made to remove the second cell from the mobile unit's Active Set if either the pilot signal strength for the second cell falls below a predetermined threshold or the round trip delay value exceeds a predetermined maximum.

In yet another embodiment, the method optimizes the neighbor list for the cell by maintaining a second list of cells that are not in the neighbor list but have had their pilot signals reported by the mobile unit operating in the dominant cell. Furthermore, the pilot signal strength for the reported cells is tracked, along with the number of occurrences with which any particular cell has been reported. As a result, a determination can be made as to whether to include certain cells in the neighbor list.

A technical advantage achieved is that cost of the cellular network is minimized due to an increased call capacity.

Another technical advantage achieved is that the potential of handing off a call to an undesired cell is greatly reduced.

Another technical advantage achieved is that the cellular network dynamically adapts to its environment.

BRIEF DESCRIPTION OF THE DRAWINGS

FIG. 1 illustrates a cellular telephone network embodying features of the present invention.

FIG. 2 is a flow chart for a method for optimizing the cellular network of FIG. 1.

FIG. 3 is a flow chart of a soft handoff management method for use by the optimization method of FIG. 2.

DESCRIPTION OF A PREFERRED EMBODIMENT

Referring to FIG. 1, the reference numeral 10 designates a cellular telephone network operating on a common frequency. The network 10 has six cells C1, C2, C3, C4, C5, and C6. Each cell C1–C6 is connected to and serviced by a BSC 12, which in turn is connected to and serviced by an MSC (not shown). A mobile unit 14 is operating in the network 10 and for the sake of example is initially located in and linked to the cell C1 (the dominant cell). As the mobile unit 14 moves around cell C1, it receives pilot signals from one or more of the remaining cells of the network 10, and if the strength of a received pilot signal exceeds a threshold value T_ADD, the mobile unit 14 sends a PSM message to the BSC 12 via the cell C1. For the remaining description, the disclosed functionality will be performed by the BSC 12, it being understood that other components of the network 10, including those not shown, may alternatively provide or assist in the disclosed functionality.

Referring to FIG. 2, whenever the mobile unit 14 initiates a call, the BSC 12 performs an optimization routine 20. At step 21 a PSM message is received from the mobile unit 14. It is understood that if the mobile unit 14 never detects a pilot signal that exceeds the threshold value T_ADD, the mobile unit will never send a PSM message and the optimization routine 20 will not be completed. At step 22, upon receipt of the PSM message from the mobile unit 14, the BSC 12 determines if the pilot indicated by the PSM message is in the neighbor list ("N_LIST") 23 for the dominant cell. The N_LIST 23 contains a pilot number ("PN") offset for all potential Active Set Pilots for mobile units operating in the dominant cell C1. It is also understood that the N_LIST 23 may be initially determined by the radio frequency ("RF") design of the network 10. For example, the N_LIST 23 may include the PN offsets for cells C2, C4 and C5. However, as will become evident in the following discussion, the N_LIST 23 will be optimized due to actual performance characteristics of the network 10.

If the PN offset is in the N_LIST 23, execution proceeds to step 24 in which a soft handoff management routine is performed to update two matrices: a status matrix and a performance matrix, both described in greater detail below. If at step 22 the PN offset is not in the N_LIST 23, execution proceeds to step 26 in which a pilot consideration matrix is updated, which is also described in greater detail below. Upon completion of steps 24 or 26, execution returns to step 21. Furthermore, as the pilot consideration matrix is updated, it can be used to optimize the N_LIST 23. Such optimization may occur more frequently during initial operation of the network 10 and less frequently thereafter.

The pilot consideration matrix is updated for each cell indicated by a PSM message that is not in the N_LIST. Table 1 below illustrates an exemplary pilot consideration matrix for the dominant cell C1. The columns of Table 1 represent certain parameters of these pilot signals, including the PN offset value, the strongest measured PSM for the cell, and the number of times the pilot signal has been reported. The rows represent the individual cells that are under consideration, the number of rows being dynamic. The pilot consideration matrix Table 1 provides an indication of important cells missing from the N_LIST and can be used at a later time to optimize the N_LIST for a certain cell. This table is important for an operating cellular network to identify network interference and take remedial action to improve the network's performance. Also, this allows the cellular network 10 to be responsive to changes in its environment.

TABLE 1

| | PN offset | Pilot Strength | No. of Occurrences |
|---|---|---|---|
| cell C3 | | | |
| cell C6 | | | |
| cell Cn | | | |

Referring to FIG. 3, the soft handoff management routine 24 begins at step 28 where the performance matrix 30a and the status matrix 30b are updated. The matrices 30a and 30b are updated according to certain predefined performance and status criteria, examples of which are described below.

The performance matrix 30a is maintained for each cell C1–C6 of the network 10. Table 2 below illustrates an exemplary performance matrix for the cell C1. The columns of Table 2 represent the cells in the N_LIST for the cell C1. In continuance of the example described above, the columns are initially C2, C4, and C5. The rows of Table 2 designate counters for certain performance measurements. For the sake of example, five rows R1, R2, R3, R4, and R5 are defined as follows:

R1: successful handoffs;
R2: handoff failures due to a secondary cell being removed from the mobile unit's Active Set for having a pilot signal below a certain threshold value T_DROP.
R3: handoff failures due to a lack of available channel elements;
R4: handoff failures due to reasons other than R2 or R3;
R5: handoff failures due to the soft handoff management routine 24 (FIG. 3).

Each (row, column) entry of Table 2 may be incremented for each operation of step 24. For example, if a successful soft handoff is performed with the cell C2, then the counter for (R1, C2) is incremented. If however, an attempted soft handoff to the cell C4 fails because no channel elements of the cell C4 are available, then the counter for (R3, C4) is incremented.

TABLE 2

| | C2 | C4 | C5 |
|---|---|---|---|
| R1 | 1 | | |
| R2 | | | |
| R3 | | 1 | |
| R4 | | | |
| R5 | | | |

A status matrix 30b is also maintained for each cell C1–C6 of the network 10. Table 3 below illustrates an exemplary status matrix for the dominant cell C1. The columns of Table 3 represent all the cells with which the mobile units operating in cell C1 are in soft handoff during the duration of the call, i.e., Active Set Pilots ASP1, ASP2 . . . ASPn. The Active Set Pilots are derived from the N_LIST 23 as well as the N_LISTs of the other cells with which the mobile units are in soft handoff. At any given time, there may be a different number of Active Set Pilots for any one mobile unit and therefore the number of columns in the status matrix is dynamic. However, practical constraints limit the number of Active Set Pilots to six. The rows of Table 3 represent certain status measurements associated with each mobile unit while in communication with each Active Set Pilot. For the sake of example, eight rows R6, R7, R8, R9, R10, R11, R12 and R13 are defined as follows:

R6: strength of the last reported pilot signal from the Active Set Pilot;

R7: strength of the pilot signal of the Active Set Pilot before soft handoff was initiated;

R8: the most recent round trip delay ("RTD") measurement from the cell site of the Active Set Pilot to the mobile unit 14;

R9: extra RF link capacity for the cell site of the Active Set Pilot;

R10: number of channel elements available in the cell site of the Active Set Pilot;

R11: status of the Active Set Pilot, the status being either 1) current "C", 2) most recently removed from the Active Set "MR", 3) removed from the Active Set "R", or 4) not added to the Active Set "NA";

R12: strength of the pilot signal of the Active Set Pilot when it was removed from the Active Set;

R13: a reason for removing the Active Set Pilot from the Active Set, the reason being either 1) handoff failures due to a pilot signal strength falling below a predetermined minimum threshold, 2) handoff failure due to any other reason; 3) the RTD exceeds maximum, 4) there are no available channel elements, 5) there are no available RF links, 6) the pilot signal designates an undesirable cell.

Each (row, column) entry of Table 3 contains information that may be updated for each operation of step 24. For example, an RTD maximum value is specified for each cell, such as ASP2. The RTD maximum value represents a maximum distance in which a mobile unit can be from the corresponding cell site and maintain a reliable RF link. On occasion, the pilot signal from ASP2 may be strong (e.g., a measurement of "Y" decibels where Y>T_ADD) but the RTD distance will be too great (e.g., a distance of "X" meters, where X>the RTD maximum value). In these occasions, the particular cell is undesirable for soft handoff because the mobile unit is outside the cell's intended coverage area and the status matrix is updated as described below in Table 3.

TABLE 3

|     | ASP1 | ASP2 | ASP3 | ASPn |
|-----|------|------|------|------|
| R6  |      | Y    |      |      |
| R7  |      |      |      |      |
| R8  |      | X    |      |      |
| R9  |      |      |      |      |
| R10 |      |      |      |      |
| R11 |      |      |      |      |
| R12 |      | Y    |      |      |
| R13 |      | 3    |      |      |

Referring again to FIG. 3, after the matrices 30a, 30b have been updated in step 32, execution proceeds to step 34 where new pilots may be added to the Active Set Pilots. For a new pilot to be added to the Active Set Pilots, the PSM for the pilot must be within a predefined threshold T_NADD of the signal strength of the strongest pilot in the Active Set. In this way, the number of pilot signals that are strong enough to be reported (exceed the T_ADD threshold) but are not comparatively strong (do not fall within the T_NADD threshold of the strongest pilot signal) are not added to the Active Set Pilots, thereby saving capacity of the network 10.

To further improve capacity, at step 36, any undesirable pilots are removed. For example, if the counters R8, R9, and/or R10 for any of the Active Set Pilots ASP1 . . . ASPn have been activated, the counter R6 is examined for every Active Set Pilot and compared with the signal strength of the strongest Active Set Pilot. If the signal strength of any Active Set Pilot is not within a predefined threshold T_REMOVE (similar to T_NADD), the corresponding pilot is removed from the Active Set. When a pilot is removed from the Active Set, the appropriate counters R11, R12, R13 are updated for that pilot. When updating the counter R12, any counter with the value "MR" is replaced with the value "R" and the counters for any recently removed ASP's are given the value "MR".

At step 38, certain ones of the pilots may be re-admitted to the Active Set. For example, the counter R6 and R7 may be examined and if the signal strength of a pilot that has been removed from the Active Set is within a predefined threshold T_DROPADD (similar to T_REMOVE and T_NADD), the corresponding pilot may be readmitted to the Active Set. In addition, since the most recently removed pilots are indicated by the counter R12, the corresponding pilots may also be readmitted, as required.

Although illustrative embodiments of the invention have been shown and described, other modifications, changes, and substitutions are intended in the foregoing disclosure. For examples, a single threshold value can be substituted for several of the above identified thresholds. Accordingly, it is appropriate that the appended claims be construed broadly and in a manner consistent with the scope of the invention.

What is claimed is:

1. A method for optimizing the performance of a cellular telephone network including a first cell, a second cell, and a mobile unit located in the first cell, the method comprising maintaining status values concerning the first cell and adjusting conditions for handoff in response to the status values, the status values including a pilot signal strength measurement for the second cell, a round trip delay measurement from the second cell to the mobile unit, and a designation of whether the second cell is current, removed or most recently removed, such that the second cell is removed from a list of handoff cells if the pilot signal strength measurement for the second cell falls below a predetermined threshold or if the round trip delay measurement exceeds a predetermined maximum.

2. The method of claim 1 wherein the status values further include a designation for available hardware resource of the second cell, and a reason for removing the second cell from the list of handoff cells.

3. A method for optimizing the performance of a cellular telephone network including first and second cells, the method comprising the steps of:

maintaining conditions for handoff for a mobile unit in the first cell;

storing a first status value indicating whether the second cell is current, removed or most recently removed from a list; and adjusting the conditions for handoff in response to the status value.

4. The method of claim 3 further comprising:

storing a second status value designating an available hardware resource of the second cell.

5. The method of claim 3 further comprising:

maintaining a list of potential handoff cells; and storing a second status value designating a reason for removing the second cell from the list.

6. The method of claim 3 further comprising:

storing a second status value designating a round trip delay measurement from the second cell to the mobile unit.

7. The method of claim 3 further comprising:

storing a second status value designating a pilot signal strength measurement for the second cell.

8. A system for optimizing the performance of a cellular telephone network including first and second cells, the system comprising:

means for maintaining a list of handoff cells for a mobile unit in the first cell;

means for storing a first status value indicating whether the second cell is current, removed, or most recently removed from the list; and means for adjusting the list in response to the status value.

9. The system of claim 8 further comprising:

means for storing a second status value designating an available hardware resource of the second cell;

means for storing a third status value designating a reason for removing the second cell from the list;

means for storing a fourth status value designating a round trip delay measurement from the second cell to the mobile unit; and means for storing a fifth status value designating a pilot signal strength measurement for the second cell.

\* \* \* \* \*